(12) United States Patent
Kim et al.

(10) Patent No.: US 10,654,318 B2
(45) Date of Patent: May 19, 2020

(54) NON-PNEUMATIC TIRE

(71) Applicants: Kumho Tire Co., Inc., Gwangju (KR); The Yokohama Rubber Company, Ltd., Tokyo (JP)

(72) Inventors: Kee-Woon Kim, Gwangju (KR); Chang-Jung Park, Gwangju (KR); Chul-Woo Kwark, Gwangju (KR); Gwi-Sung Shin, Gwangju (KR); Soon-Wook Hwang, Gwangju (KR); Michio Shimizu, Tokyo (JP); Jun Matsuda, Tokyo (JP)

(73) Assignees: KUMHO TIRE CO., INC., Gwangju (KR); THE YOKOHAMA RUBBER COMPANY, LTD., Tokyo (JP)

( * ) Notice: Subject to any disclaimer, the term of this patent is extended or adjusted under 35 U.S.C. 154(b) by 436 days.

(21) Appl. No.: 15/597,579

(22) Filed: May 17, 2017

(65) Prior Publication Data
US 2018/0029420 A1    Feb. 1, 2018

(30) Foreign Application Priority Data
Jul. 29, 2016   (KR) .......................... 10-2016-0097411

(51) Int. Cl.
*G06C 7/08*     (2006.01)
*B60C 7/10*     (2006.01)
*B60C 7/14*     (2006.01)

(52) U.S. Cl.
CPC .............. *B60C 7/14* (2013.01); *B60C 7/143* (2013.01); *B60C 2007/146* (2013.01)

(58) Field of Classification Search
CPC .... B60C 7/00; B60C 7/08; B60C 7/10; B60C 7/14; B60C 7/143; B60C 7/16; B60C 7/18; B60C 2007/146
See application file for complete search history.

(56) References Cited

U.S. PATENT DOCUMENTS

| | | |
|---|---|---|
| 5,042,544 A | 8/1991 | Dehasse |
| 2011/0079335 A1* | 4/2011 | Manesh ................. B60C 7/12 152/310 |

(Continued)

FOREIGN PATENT DOCUMENTS

| | | |
|---|---|---|
| CN | 102398474 A | 4/2012 |
| CN | 104582980 A | 4/2015 |

(Continued)

*Primary Examiner* — Justin R Fischer
(74) *Attorney, Agent, or Firm* — Saliwanchik, Lloyd & Eisenschenk (57) ABSTRACT

In view of the above, the disclosure provides a non-pneumatic tire capable of enhancing a load supporting performance and a shock absorbing effect and improving a braking and traction performance. The present disclosure provides a non-pneumatic tire comprising a band part and a spoke part; where, a band part includes an inner band and an outer band that is separated from the inner band and surrounds an outer peripheral surface of the inner band; and where, a spoke part includes a plurality of first spokes that is arranged in a circumferential direction between the inner band and the outer band and connects the inner band and the outer band. Furthermore, according to another embodiment, a spoke part may include second spokes that connected to first spokes adjacent to each other at wherein first embodiment.

19 Claims, 8 Drawing Sheets

(56) References Cited

U.S. PATENT DOCUMENTS

| | | |
|---|---|---|
| 2012/0060991 A1 | 3/2012 | Mun et al. |
| 2014/0062168 A1 | 3/2014 | Martin et al. |
| 2015/0258853 A1 | 9/2015 | Fudemoto et al. |

FOREIGN PATENT DOCUMENTS

| | | |
|---|---|---|
| CN | 204870334 | 12/2015 |
| JP | 2012062045 A | 3/2012 |
| JP | 2013079037 A | 5/2013 |
| JP | 2014125081 A | 7/2014 |
| JP | 2015151006 A | 8/2015 |
| JP | 2015151009 A | 8/2015 |
| KR | 1019910006047 A | 8/1991 |

* cited by examiner

NON-PNEUMATIC TIRE

CROSS REFERENCE TO A RELATED APPLICATION

This application is based on and claims priority from Korean Patent Application No. 10-2016-0097411, filed on Jul. 29, 2016, the disclosure of which is incorporated herein in its entirety by reference.

TECHNICAL FIELD

The disclosure relates to a non-pneumatic tire.

BACKGROUND

A tire attached to a wheel of various vehicles such as a compact vehicle, a heavy equipment vehicle and the like has a function of supporting a vehicle load, a function of transmitting power of a vehicle to a ground, and a function of reducing vibration and shock from the ground during driving of the vehicle.

A conventional pneumatic tire has an excellent cushioning effect against collision and bending/stretching due to its air pressure. However, when the tire is pricked or damaged by an external object, the air pressure is not maintained, which makes it difficult to realize the function of the tire. Further, when the tire is damaged during driving, handling and braking performance of the vehicle deteriorate and this may cause safety problems.

To that end, a non-pneumatic tire that does not require air filling has been developed. In the non-pneumatic tire, a spoke is provided between a tread and a wheel in order to realize the function of the air pressure in the conventional pneumatic tire. The non-pneumatic tire is generally used for low-speed vehicles or special purpose vehicles, and the cushioning effect, the driving performance and the like thereof are determined by a structure and a shape of the spoke.

A conventional non-pneumatic tire has good load supporting characteristics but poor noise, vibration and harshness characteristics. Or, the conventional non-pneumatic tire has improved noise, vibration and harshness characteristics but poor load supporting characteristics.

Therefore, it is required to develop a general-purpose spoke structure applicable to various vehicle environments due to its good load supporting characteristics, durability, and noise, vibration and harshness characteristics, and a non-pneumatic tire having such a spoke structure.

SUMMARY

In view of the above, the disclosure provides a non-pneumatic tire capable of enhancing a load supporting performance and a shock absorbing effect and improving a braking and traction performance.

The present disclosure provides a non-pneumatic tire comprising a band part, including an inner band and an outer band that is separated from the inner band and surrounds an outer peripheral surface of the inner band; and a spoke part, including a plurality of first spokes that is arranged in a circumferential direction between the inner band and the outer band and connects the inner band and the outer band, wherein each of the first spokes includes:

a first inclined portion inclined from an outer peripheral surface of the inner band toward the outer band; a second inclined portion inclined from an end portion of the first inclined portion toward the outer band in a direction crossing with an inclined direction of the first inclined portion; a third inclined portion inclined from an end portion of the second inclined portion toward the outer band in a direction crossing with an inclined direction of the second inclined portion; and a fourth inclined portion extending from an end portion of the third inclined portion in a direction crossing with an inclined direction of the third inclined portion and having an end portion in contact with an inner peripheral surface of the outer band.

Further, the present disclosure provides the non-pneumatic tire, wherein the first spoke has two bent portions bent in the same direction and one bent portion bent in a direction crossing with the direction in which the two bent portions are bent.

Further, the present disclosure provides, wherein the first spoke has a W-shaped radial cross section.

Further, the present disclosure provides, wherein the first to the fourth inclined portion have constant thicknesses.

Further, the present disclosure provides, wherein the thicknesses of the first to the fourth inclined portion are sequentially increased or decreased in the order of the first inclined portion, the second inclined portion, the third inclined portion, and the fourth inclined portion.

Further, the present disclosure provides, wherein the thickness of the second inclined portion is greater than the first inclined portion, and the thickness of the third inclined portion is greater than the thickness of the fourth inclined portion.

Further, the present disclosure provides, wherein the thickness of the first inclined portion is greater than the thickness of the second inclined portion, and the thickness of the fourth inclined portion is greater than the thickness of the third inclined portion.

Further, the present disclosure provides, wherein a contact point between the first and the second inclined portion is positioned at a point separated from the inner band by a distance corresponding to 15% to 35% of a distance between the inner band and the outer band, a contact point between the second and the third inclined portion is positioned at a point separated from the inner band by a distance corresponding to 40% to 60% of the distance between the inner band and the outer band, and a contact point between the third and the fourth inclined portion is positioned at a point separated from the inner band by a distance corresponding to 65% to 85% of the distance between the inner band and the outer band.

Further, the present disclosure provides, wherein the spoke part further includes second spokes that connect the first spokes adjacent to each other, wherein each of the second spokes includes:

a first connection portion extending from the contact point between the first inclined portion and the second inclined portion and connected to a contact point between a second and a third inclined portion of a first spoke adjacent thereto; and a second connection portion extending from the contact portion between the third and the fourth inclined portion and connected to a contact point between the second and the third inclined portion of the first spoke adjacent thereto.

Further, the present disclosure provides, wherein a first space is provided between the first spoke and the second spoke, and a second space is provided at a radially inner side and a radially outer side of the first space.

Further, the present disclosure provides, wherein the first space and the second space are repetitively formed along the circumferential direction.

Further, the present disclosure provides, wherein the second spoke has a V-shaped radial cross section.

Further, the present disclosure provides, wherein a shear band is provided at an outer peripheral surface of the outer band and a tread is provided at an outer side of the shear band.

Further, the present disclosure provides, wherein the spoke part is made of Thermo Plastic Elastomer (TPE) containing at least one of Thermo Plastic Polyester Elastomer (TPEE), Thermo Plastic Polyurethane Elastomer (TPU), Thermo Plastic Olefinic Elastomer (TPO), and Thermo Plastic Polyamide Elastomer (TPAE).

Further, the present disclosure provides, wherein the spoke part has a tensile modulus ranging from 30 MPa to 200 MPa.

Further, the present disclosure provides, wherein the spoke part has a flexural modulus ranging from 40 MPa to 300 MPa.

The non-pneumatic tire according to an embodiment can enhance the load supporting performance and the shock absorbing effect and improve the braking and traction performance.

BRIEF DESCRIPTION OF THE DRAWINGS

The objects and features of the disclosure will become apparent from the following description of embodiments, given in conjunction with the accompanying drawings, in which.

DETAILED DESCRIPTION OF THE EMBODIMENTS

Before the detailed description of the disclosure, it should be noted that terminologies or terms used throughout the present specification or claims should not be interpreted as general or lexical meaning, and may need to be understood as meaning and concepts corresponding to technical spirit of the disclosure based on a principle that the inventor may appropriately define the terms to describe the inventor's invention according to a best mode. Therefore, embodiments and drawings of the disclosure are only examples and thus may be represent all the technical spirit of the disclosure. Accordingly, it may be understood that the scope of the disclosure may be defined by various equivalents and modifications.

Hereinafter, embodiments will be described in detail with reference to the accompanying drawings. Like reference numerals will be used for like parts throughout the drawings.

Also, in describing the disclosure, if it is determined that a detailed description of related known components or functions unnecessarily obscures the gist of the present invention, the detailed description thereof will be omitted. For the same reason, some components are exaggerated, omitted or schematically illustrated in the accompanying drawings. The size of the respective components does not entirely reflect the actual size.

Figure 1:
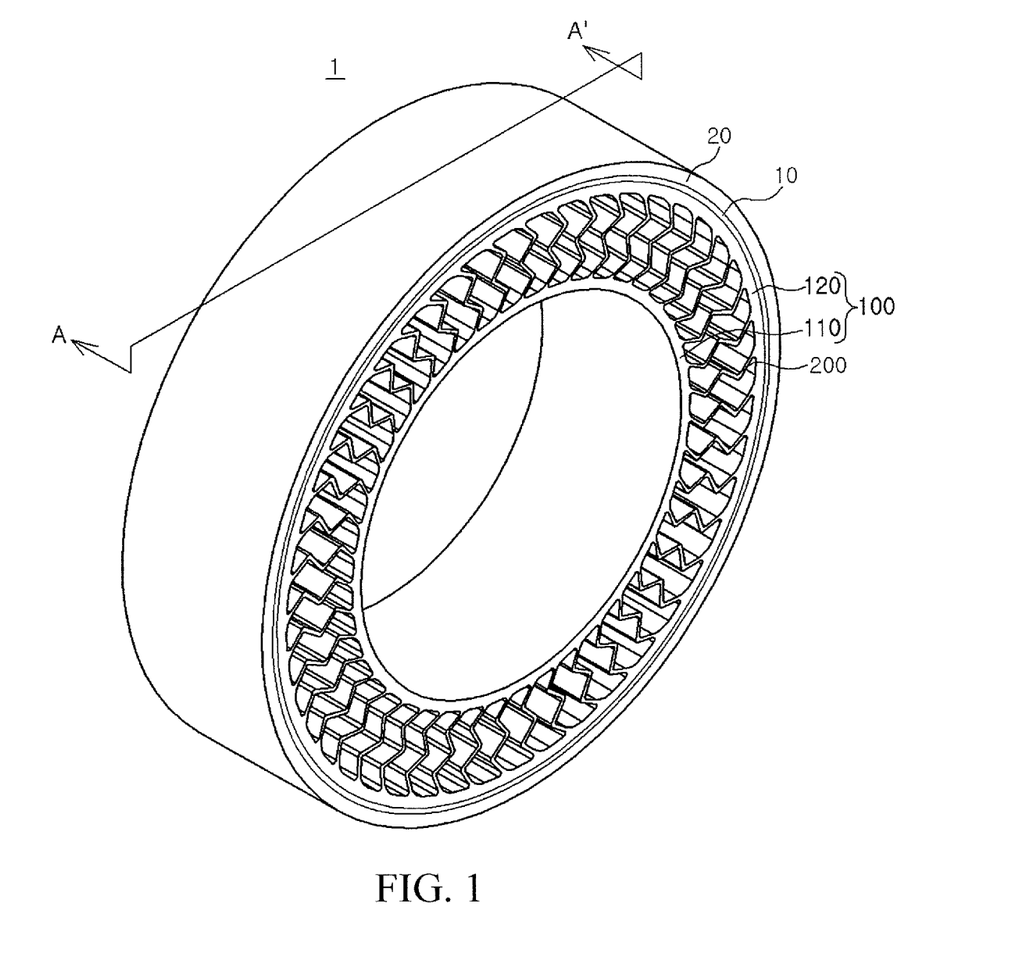
FIG. 1 is a schematic perspective view of a non-pneumatic tire according to an embodiment.
Figure 2:
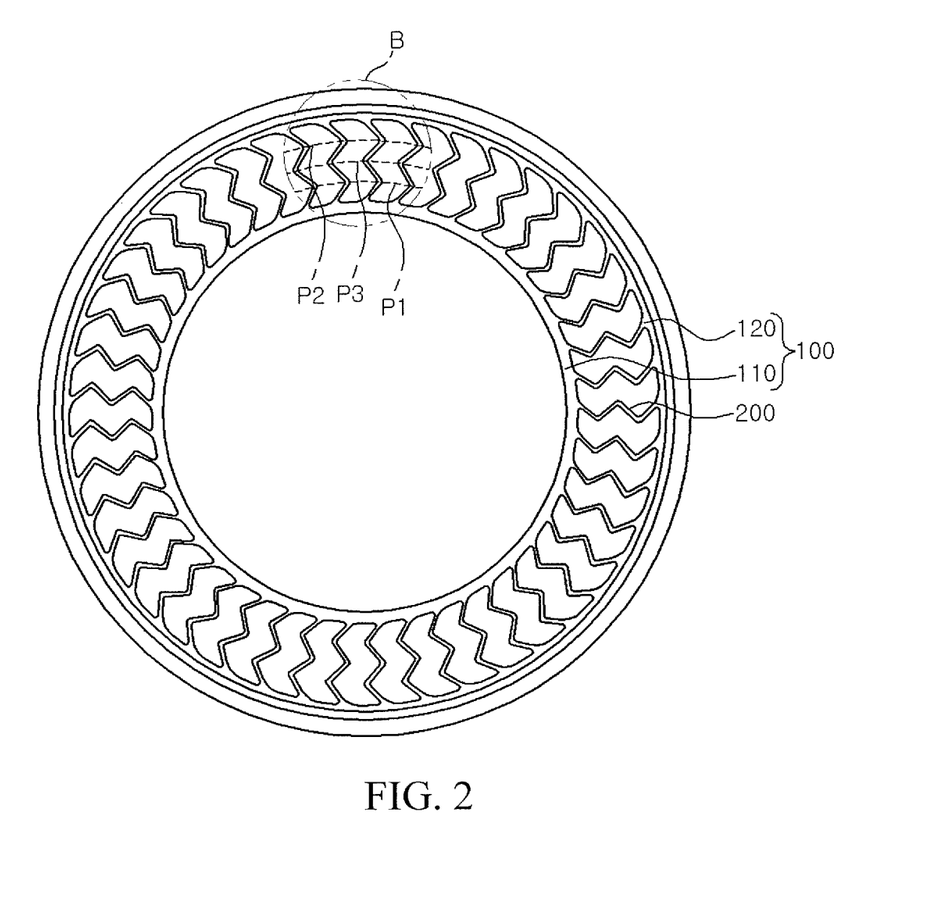
FIG. 2 is a schematic cross sectional view taken along a line A-A' of FIG. 1.
Figure 3:
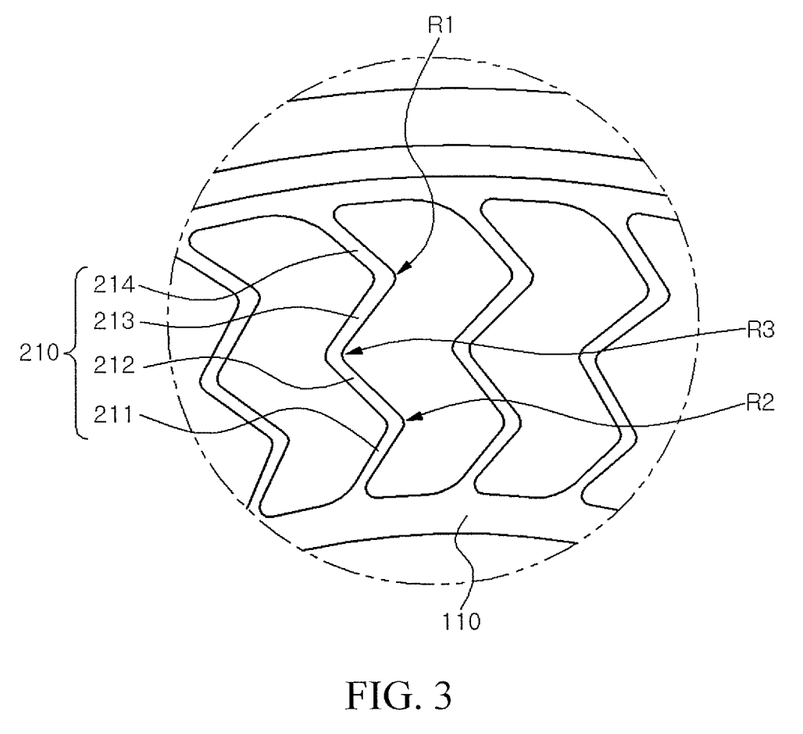
FIG. 3 is an enlarged view showing a B portion of FIG. 2.

FIG. 1 is a schematic perspective view of a non-pneumatic tire according to an embodiment. FIG. 2 is a schematic cross sectional view taken along a line A-A' of FIG. 1. FIG. 3 is an enlarged view showing a B portion of FIG. 2.

Referring to FIGS. 1 to 3, a non-pneumatic tire 1 according to an embodiment may include a band part 100 and a spoke part 200.

The band part 100 may have a shape corresponding to an overall outer shape of the non-pneumatic tire. The band part 100 may have, e.g., a circular ring shape.

The band part 100 may include an inner band 110 and an outer band 120, each having a predetermined width and a strip shape with both ends in a loop. The outer band 120 is separated from the inner band 110 and may surround an outer peripheral surface of the inner band 110. Widths in a radial direction of the inner band 110 and the outer band 120 may range from 3 mm to 15 mm.

A rim (not shown) may be coupled to an inner peripheral surface of the inner band 110. Therefore, the shape of the inner band 110 may be variously deformed depending on the shape of the rim.

The outer band 120 is separated from the inner band 110 by a predetermined distance and may surround the inner band 110. In other words, the inner peripheral surface of the outer band 120 and the outer peripheral surface of the inner band 110 may face each other. At this time, the outer band 120 and the inner band 110 may be connected to each other by the spoke part 200 to be described later. The outer band 120 may define an outer shape of the tire.

A shear band 10 may be provided at an outer peripheral surface of the outer band 120. The shear band 10 may be provided in a shape corresponding to the shape of the outer band 120 along a circumferential direction of the outer band 120.

In the following description, a circumferential direction may be a rotation direction along the outer peripheral surface of the outer band 120 in FIG. 2, and a radial cross section may be a cross section whose normal line in parallel to a rotation axis of the non-pneumatic tire 1.

The shear band 10 may primarily reduce an initial stress applied to the non-pneumatic tire 1 and distribute the stress to an upper portion of the non-pneumatic tire 1. The shear band 10 may be manufactured by using a steel belt layer or a composite material containing carbon fiber. For example, the shear band 10 may be made of CFRP (Carbon Fiber Reinforced Plastics) or formed in one or more layers of steel-cord composite.

A tread 20 may be provided at an outer peripheral surface of the shear band 10. The tread 20 may be made of rubber and may be provided at an outermost side of the non-pneumatic tire 1. The tread 20 may be in direct contact with a ground. Various structures used in this field may be employed for the tread 20.

The spoke part 200 may be provided between the inner band 110 and the outer band 120. The spoke part 200 may serve as a supporting structure that connects the inner band 110 and the outer band 120 also serves as a cushioning member that distributes and absorbs shock applied to the non-pneumatic tire 1. Further, the spoke part 200 supports a load of a vehicle with the non-pneumatic tire 1. The spoke part 200 may be made of Thermo Plastic Elastomer (TPE) containing, e.g., at least one of Thermo Plastic Polyester Elastomer (TPEE), Thermo Plastic Polyurethane Elastomer (TPU), Thermo Plastic Olefinic Elastomer (TPO), and Thermo Plastic Polyamide Elastomer (TPAE).

The spoke part 200 may have the following mechanical properties.

| Mechanical properties | Tensile Modulus (MPa) | Flexural Modulus (MPa) |
|---|---|---|
| Measurement value | 30-200 | 40-300 |
| Measurement method | ASTM D638 | ASTM D790 |

The tensile modulus of the spoke part 200 may be measured by ASTM D638. The tensile modulus of the spoke part 200 may be within a range from 30 MPa to 200 MPa. When the tensile modulus of the spoke part 200 is less than 30 MPa, the load supporting power becomes weak. Accordingly, the spoke part 200 may be excessively deformed even by small impact and the deformation of the spoke part 200 may result in breakage of the spoke part 200. When the tensile modulus of the spoke part 200 exceeds 200 MPa, hardness is excessively increased. Accordingly, the bending/stretching of the spoke part 200 becomes poor and ride comfort deteriorates. In addition, a footprint of the tire is reduced, so that the braking performance deteriorates.

The flexural modulus of the spoke part 200 may be measured by ASTM D790. The flexural modulus of the spoke part 200 may be within a range from 40 MPa to 300 MPa. When the flexural modulus of the spoke part 200 is less than 40 MPa, the load supporting power becomes weak. Accordingly, the spoke part 200 may be excessively deformed even by small impact and the deformation of the spoke part 200 may result in breakage of the spoke part 200. When the flexural modulus of the spoke part 200 exceeds 300 MPa, the bending/stretching of the spoke part 200 becomes poor and the ride comfort deteriorates.

The spoke part 200 absorbs the shock and supports the load, and thus requires a mechanical configuration suitable therefor. Hereinafter, a detailed configuration of the spoke part 200 of the non-pneumatic tire 1 according to an embodiment will be described.

For example, the spoke part 200 may include a plurality of first spokes 210 arranged in a circumferential direction while being spaced apart from each other at a predetermined interval. The first spokes 210 connect the inner band 110 and the outer band 120. Each of the first spokes 210 may have a W-shaped radial cross section (see FIG. 3).

For example, the first spoke 210 includes a first inclined portion 211 extending from the outer peripheral surface of the inner band 110 toward the outer band 120, a second inclined portion 212 extending from an end portion of the first inclined portion 211 toward the outer band 120 in a direction crossing with the inclined direction of the first inclined portion 211, a third inclined portion 213 extending from an end portion of the second inclined portion 212 toward the outer band 120 in a direction crossing with the inclined direction of the second inclined portion 212, and a fourth inclined portion 214 extending from an end portion of the third inclined portion 213 in a direction crossing with the inclined direction of the third inclined portion 213 and having an end portion in contact with the inner peripheral surface of the outer band 120. In other words, the first spoke 210 may have two bent portions R1 and R2 bent in the same direction and one bent portion R3 bent in a direction crossing with the direction in which the two bent portions are bent. The bent portions R1 to R3 can improve durability by preventing stress concentration due to bending and stretching.

On the assumption that the inclination of the inclined surface of the first inclined portion 211 is positive inclination, the inclination of the inclined surface of the second inclined portion 212 becomes negative inclination. Further, the inclination of the inclined surface of the third inclined portion 213 becomes the positive inclination and the inclination of the inclined surface of the fourth inclined portion 214 becomes the negative inclination. In other words, the first and the third inclined portion 211 and 213 may have the positive inclination, and the second and the fourth inclined portion 212 and 214 may have the negative inclination. Therefore, the first spoke 210 may have a W shape as a whole.

A contact point between the first and the second inclined portion 211 and 212 may be positioned at a point P1 separated from the inner band 110 by a distance corresponding to 15% to 35% of a distance between the inner band 110 and the outer band 120. A contact point between the third and the fourth inclined portion 213 and 214 may be positioned at a point P2 separated from the inner band 110 by a distance corresponding to 65% to 85% of the distance between the inner band 110 and the outer band 120.

A contact point between the second and the third inclined portion 212 and 213 may be positioned at a point P3 separated from the inner band 110 by a distance corresponding to 40% to 60% of the distance between the inner band 110 and the outer band 120. However, the positions of the contact points among the first to the fourth inclined portions 211 to 214 are not limited to the above-described positions and may be variously changed as long as the W shape of the spoke 210 is maintained.

Each of the first to the fourth inclined portion 211 to 214 may have a constant thickness. In other words, the first inclined portion 211 has a constant thickness itself, the second inclined portion 212 has a constant thickness itself, the third inclined portion 213 has a constant thickness itself, the fourth inclined portion 214 has a constant thickness itself.

However, the relative thicknesses of the first to the fourth inclined portion 211 to 214 may be different. For example, the thicknesses of the first to the fourth inclined portion 211 to 214 may be sequentially increased or decreased in the order of the first inclined portion 211, the second inclined portion 212, the third inclined portion 213 and the fourth inclined portion 214.

Further, the thickness may be increased or decreased from the second and the third inclined portion 212 and 231 toward the first and the fourth inclined portion 211 and 214. In other words, the thicknesses of the second and the third inclined portion 212 and 213 may be greater than those of the first and the fourth inclined portion 211 and 214, or the thicknesses of the first and the fourth inclined portion 211 and 214 may be greater than those of the second and the third inclined portion 212 and 213.

In other words, the thicknesses of the inclined portions of the first spoke 210 according to the embodiment may be variously changed as long as the first spoke 210 has a W-shaped cross section. By controlling the thicknesses of the first to the fourth inclined portion 211 to 214, the entire stiffness of the non-pneumatic tire 1 in the vertical direction can be controlled. As a result, vibration or shock during driving can be reduced and ride comfort can be improved.

Figure 4:
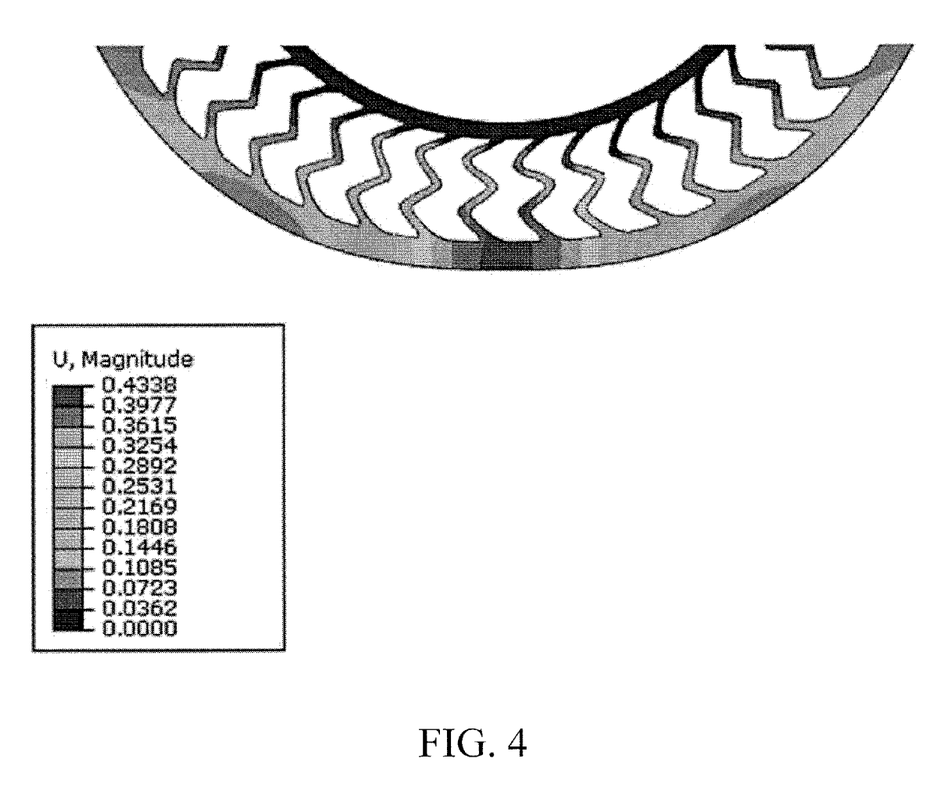
FIG. 4 is a cross sectional view schematically showing a magnitude of deformation in the case where a load is applied to the non-pneumatic tire according to the embodiment.

FIG. 4 is a schematic cross sectional view of a magnitude of deformation in the case where a load is applied to the non-pneumatic tire according to the embodiment. Referring to FIG. 4, when the load is applied to the non-pneumatic tire 1 according to the embodiment, the shock is transferred to the inner band 110 along the first spokes 210. In this case, the load is not concentrated on a first spoke 210 to which the shock is applied and can be distributed to and absorbed by other adjacent first spokes through the outer band 120.

The first spoke 210 may have a W shape as a whole. With this mechanical shape, the first spoke 210 can stably serve as a spring against shock. Therefore, the non-pneumatic tire 1 according to the embodiment can improve the load supporting performance and the shock absorbing effect.

Figure 5:
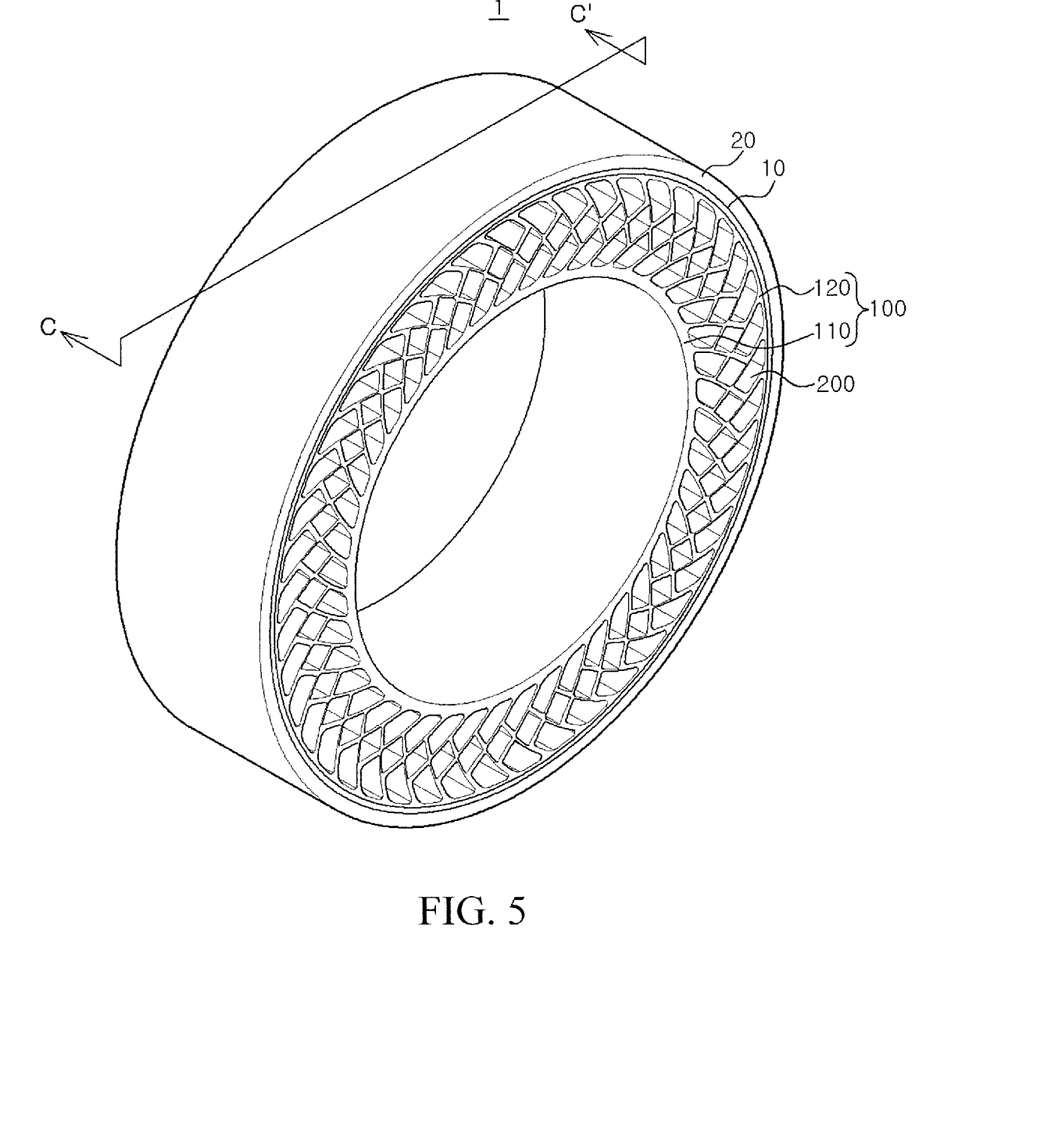
FIG. 5 is a schematic perspective view of a non-pneumatic tire according to another embodiment.
Figure 6:
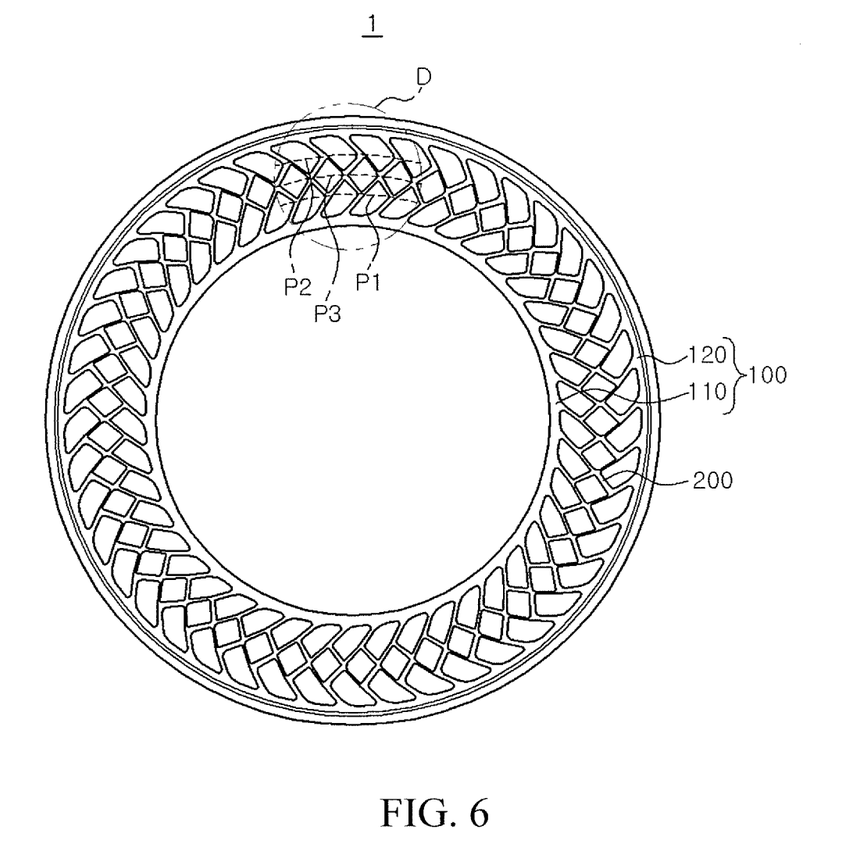
FIG. 6 is a schematic cross sectional view taken along a line C-C' of FIG. 5.
Figure 7:
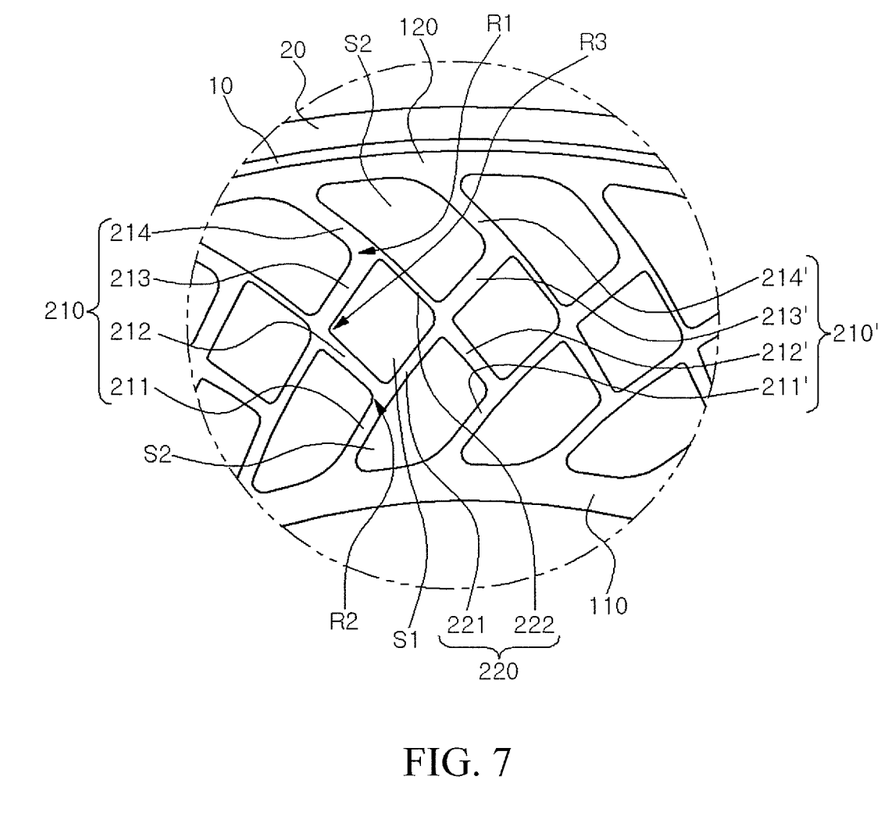
FIG. 7 is an enlarged view showing a D portion of FIG. 6.
Figure 8:
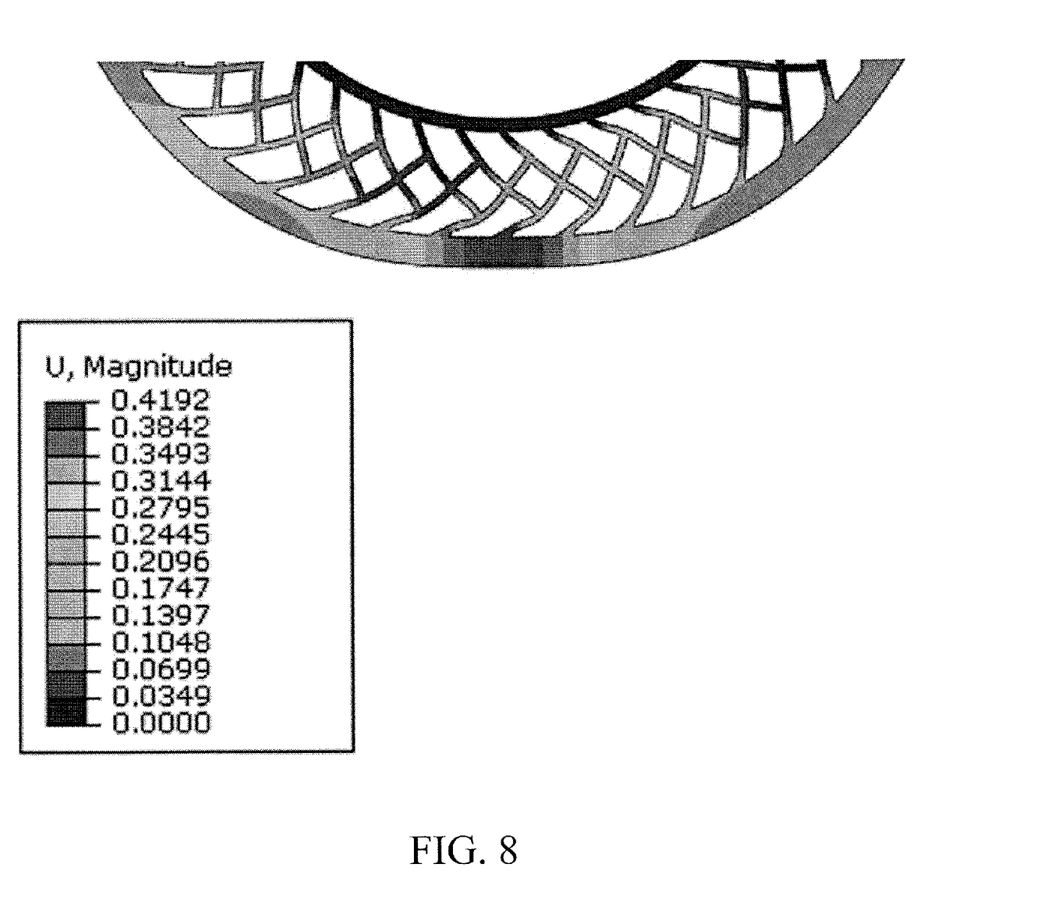
FIG. 8 is a schematic cross sectional view showing a magnitude of deformation in the case where a load is applied to the non-pneumatic tire according to another embodiment.

FIG. 5 is a schematic perspective view of a non-pneumatic tire according to another embodiment. FIG. 6 is a schematic cross sectional view taken along a line C-C' of FIG. 5. FIG. 7 is an enlarged view showing a D portion of FIG. 6. FIG. 8 is a schematic cross sectional view showing a magnitude of deformation in the case where a load is applied to the non-pneumatic tire according to another embodiment. Hereinafter, a configuration of a non-pneumatic tire 1 according to another embodiment will be described.

The non-pneumatic tire 1 according to another embodiment has the same configuration as that of the non-pneumatic tire 1 according to the embodiment which is illustrated in FIGS. 1 to 4 except the configuration of the spoke 200.

Therefore, the detailed description on the same configuration will be omitted.

Referring to FIGS. 5 to 7, in the non-pneumatic tire 1 according to another embodiment, a spoke part 200 may include a plurality of first spokes 210 that is arranged in a circumferential direction and connects the inner band 110 and the outer band 120, and second spokes 220 that connect the first spokes 210 and 210' adjacent to each other.

The first spokes 210 may be spaced apart from each other by a predetermined distance between the inner band 110 and the outer band 120. The first spokes 210 may have a W-shaped radial cross section (see FIG. 3).

In other words, the first spoke 210 may have three bent portions R1 to R3 and the second spoke 220 may connect the two bent portions R1 and R2 of the first spoke 210 and the first spoke 210' adjacent thereto. For example, the second spoke 220 may connect vertices of the bent portions R1 and R2 of the first spoke 210 and a vertex of the bent portion R3 of the first spoke 210'.

The second spoke 220 may have a V-shaped radial cross section. For example, the second spoke 220 may include: a first connection portion 221 extending from the contact point between the first and the second inclined portion 211 and 212 of the first spoke 210 and connected to a contact point between a second and a third inclined portion 212' and 213' of the first spoke 210' adjacent thereto; and a second connection portion 222 extending from the contact point between the third and the fourth inclined portion 213 and 214 of the first spoke 210 and connected to a contact point between the second and the third inclined portion 212' and 213' of the first spoke 210' adjacent thereto.

On the assumption that the inclination of the first connection portion 221 is positive inclination, the inclination of the second connection portion 222 becomes negative inclination. Therefore, the first and the second connection portion 221 and 222 may have a V shape as a whole.

The W-shaped first spoke 210 is designed to serve as a vertical rigid body for supporting a vertical load because it includes the first to the fourth inclined portion 211 to 214 that connect the inner band 110 and the outer band 120. The V-shaped second spoke 220 is designed to serve as a horizontal (i.e., forward/backward direction) rigid body by connecting the adjacent first spokes 210. Therefore, the first spoke 210 can support the vertical load and absorb the shock, and the second spoke 220 can improve the braking and traction performance by improving the stiffness in the traveling direction of the non-pneumatic tire 1.

The following table 1 shows stiffness in a driving direction of the non-pneumatic tire (not including the second spoke) shown in FIG. 1 and that of the non-pneumatic tire (including the second spoke) shown in FIG. 5. Referring to the table 1, the stiffness in a driving direction is higher in the non-pneumatic tire shown in FIG. 5 than in the non-pneumatic tire shown in FIG. 1 because the first and the second connection portion 221 and 222 serve as a horizontal rigid body between the first spokes 210.

TABLE 1

| Stiffness in driving direction of non-pneumatic tire | | |
|---|---|---|
| Non-Pneumatic tire | FIG. 1 | FIG. 5 |
| Stiffness in driving direction [kgf/mm] | 7.261 | 50.561 |

In addition, when only the first spokes 210 are arranged in the circumferential direction between the inner band 110 and the outer band 120, the load is applied to only some of the first spokes 210 which are located at a region to which the load or the shock is applied. Therefore, some of the first spokes 210 support the load and absorb the shock. However, when the second spokes 220 are provided, the load or the shock is transferred to the adjacent first spokes 210 through the second spokes 220 and, thus, the load can be effectively absorbed and distributed. Further, the second spokes 200 serving as the horizontal rigid body can improve the braking and traction performance.

Referring to FIG. 8, the load is transferred by the second spokes 220 to the first spokes 210 (green region) located near the first spokes 210 (red region) where the non-pneumatic tire 1 is in contact with the ground. Accordingly, the load applied to the non-pneumatic tire 1 can be supported by the first spokes 210 and the second spokes 220 in a wide region.

A first space S1 may be provided between the first spoke 210 and the second spoke 220. A second space S2 may be provided at a radially inner side and a radially outer side of the first space S1. The first space S1 and the second space S2 may be repetitively formed along the circumferential direction. Further, the first space S1 and the second space S2 may provide spaces where the first and the second spoke 210 and 220 may be deformed.

While the disclosure has been shown and described with respect to the embodiments, it will be understood by those skilled in the art that various changes and modifications may be made without departing from the scope of the disclosure as defined in the following claims.

What is claimed is:
1. A non-pneumatic tire comprising:
   a band part including an inner band and an outer band, wherein the outer band is separated from the inner band and surrounds an outer peripheral surface of the inner band; and
   a spoke part including a plurality of first spokes, wherein the first spokes are arranged in a circumferential direc- tion between the inner band and the outer band and connect the inner band and the outer band, wherein the first spokes include:

a first inclined portion inclined from an outer peripheral surface of the inner band toward the outer band;

a second inclined portion inclined from an end portion of the first inclined portion toward the outer band in a direction crossing with an inclined direction of the first inclined portion;

a third inclined portion inclined from an end portion of the second inclined portion toward the outer band in a direction crossing with an inclined direction of the second inclined portion; and a fourth inclined portion extending from an end portion of the third inclined portion in a direction crossing with an inclined direction of the third inclined portion and having an end portion in contact with an inner peripheral surface of the outer band, wherein the thicknesses of the first to the fourth inclined portion are sequentially increased or decreased in an order of the first inclined portion, the second inclined portion, the third inclined portion, and the fourth inclined portion.

2. The non-pneumatic tire of claim 1, wherein the first spoke has two bent portions bent in the same direction and one bent portion bent in a direction crossing with the direction in which the two bent portions are bent.

3. The non-pneumatic tire of claim 1, wherein the first spoke has a W-shaped radial cross section.

4. The non-pneumatic tire of claim 1, wherein the first to the fourth inclined portion have constant thicknesses respectively.

5. The non-pneumatic tire of claim 1, wherein a contact point between the first and the second inclined portion is positioned at a point separated from the inner band by a distance corresponding to 15% to 35% of a distance between the inner band and the outer band, a contact point between the second and the third inclined portion is positioned at a point separated from the inner band by a distance corresponding to 40% to 60% of the distance between the inner band and the outer band, and a contact point between the third and the fourth inclined portion is positioned at a point separated from the inner band by a distance corresponding to 65% to 85% of the distance between the inner band and the outer band.

6. The non-pneumatic tire of claim 1, wherein a shear band is provided at an outer peripheral surface of the outer band and a tread is provided at an outer side of the shear band.

7. The non-pneumatic tire of claim 1, wherein the spoke part is made of Thermo Plastic Elastomer (TPE) containing at least one of Thermo Plastic Polyester Elastomer (TPEE), Thermo Plastic Polyurethane Elastomer (TPU), Thermo Plastic Olefinic Elastomer (TPO), and Thermo Plastic Polyamide Elastomer (TPAE).

8. The non-pneumatic tire of claim 1, wherein the spoke part has a tensile modulus ranging from 30 MPa to 200 MPa.

9. The non-pneumatic tire of claim 1, wherein the spoke part has a flexural modulus ranging from 40 MPa to 300 MPa.

10. A non-pneumatic tire comprising:

a band part including an inner band and an outer band, wherein the outer band is separated from the inner band and surrounds an outer peripheral surface of the inner band; and a spoke part including a plurality of first spokes, wherein the first spokes are arranged in a circumferential direction between the inner band and the outer band and connect the inner band and the outer band, wherein the first spokes includes:

a first inclined portion inclined from an outer peripheral surface of the inner band toward the outer band;

a second inclined portion inclined from an end portion of the first inclined portion toward the outer band in a direction crossing with an inclined direction of the first inclined portion;

a third inclined portion inclined from an end portion of the second inclined portion toward the outer band in a direction crossing with an inclined direction of the second inclined portion; and a fourth inclined portion extending from an end portion of the third inclined portion in a direction crossing with an inclined direction of the third inclined portion and having an end portion in contact with an inner peripheral surface of the outer band, wherein the thickness of the second inclined portion is greater than the thickness of the first inclined portion, and the thickness of the third inclined portion is greater than the thickness of the fourth inclined portion.

11. The non-pneumatic tire of claim 10, wherein the first spoke has two bent portions bent in the same direction and one bent portion bent in a direction crossing with the direction in which the two bent portions are bent.

12. The non-pneumatic tire of claim 6, wherein the first spoke has a W-shaped radial cross section.

13. A non-pneumatic tire comprising:

a band part including an inner band and an outer band, wherein the outer band is separated from the inner band and surrounds an outer peripheral surface of the inner band; and a spoke part including a plurality of first spokes, wherein the first spokes are arranged in a circumferential direction between the inner band and the outer band and connect the inner band and the outer band, wherein the first spokes includes:

a first inclined portion inclined from an outer peripheral surface of the inner band toward the outer band;

a second inclined, portion inclined from an end portion of the first inclined portion toward the outer band in a direction crossing with an inclined direction of the first inclined portion;

a third inclined portion inclined from an end portion of the second inclined portion toward the outer band in a direction crossing with an inclined direction of the second inclined portion: and a fourth inclined portion extending from an end portion of the third inclined portion in a direction crossing with an inclined direction of the third inclined portion and having an end portion in contact with an inner peripheral surface of the outer band, wherein the thickness of the first inclined portion is greater than the thickness of the second inclined portion, and the thickness of the fourth inclined portion is greater than the thickness of the third inclined portion.

14. The non-pneumatic tire of claim 13, wherein the first spoke has two bent portions bent in the same direction and one bent portion bent in a direction crossing with the direction in which the two bent portions are bent.

15. The non-pneumatic tire of claim 13, wherein the first spoke has a W-shaped radial cross section.

16. A non-pneumatic tire comprising:
a band part including an inner band and an outer band, wherein the outer band is separated from the inner band and surrounds an outer peripheral surface of the inner band; and
a spoke part including a plurality of first spokes, wherein the first spokes are arranged in a circumferential direction between the inner band and the outer band and connect the inner band and the outer band,
wherein the first spokes includes:
a first inclined portion inclined from an outer peripheral surface of the inner hand toward the outer band;
a second inclined portion inclined from an end portion of the first inclined portion toward the outer band in a direction crossing with an inclined direction of the first inclined portion:
a third inclined portion inclined from an end portion of the second inclined portion toward the outer band in a direction crossing with an inclined direction of the second inclined portion; and
a fourth inclined portion extending from an end portion of the third inclined portion in a direction crossing with an inclined direction of the third inclined portion and having an end portion in contact with an inner peripheral surface of the outer band,
wherein the spoke part further includes second spokes that connect the first spokes adjacent to each other,
wherein each of the second spokes includes:
a first connection portion extending from the contact point between the first inclined portion and the second inclined portion and connected to a contact point between a second and a third inclined portion of a first spoke adjacent thereto; and
a second connection portion extending from the contact portion between the third and the fourth inclined portion and connected to a contact point between the second and the third inclined portion of the first spoke adjacent thereto.

17. The non-pneumatic tire of claim 16, wherein a first space is provided between the first spoke and the second spoke, and a second space is provided at a radially inner side and a radially outer side of the first space.

18. The non-pneumatic tire of claim 17, wherein the first space and the second space are repetitively formed along the circumferential direction.

19. The non-pneumatic tire of claim 16, wherein the second spoke has a V-shaped radial cross section.

* * * * *